UNITED STATES PATENT OFFICE.

LUTHER ATWOOD, OF BOSTON, MASSACHUSETTS.

IMPROVEMENT IN PROCESSES FOR PURIFYING ALCOHOL.

Specification forming part of Letters Patent No. 9,951, dated August 23, 1853.

*To all whom it may concern:*

Be it known that I, LUTHER ATWOOD, of Boston, county of Suffolk, and State of Massachusetts, have invented a new and improved method for destroying and removing the odor from alcohol and alcoholic spirits, so as to fit them for certain uses to which they are not now well adapted; and I do hereby declare that the following is a full and exact description thereof.

The nature of my invention consists in destroying by chemical means the fusel-oil and odorous oils found present in alcohol and alcoholic spirits. These oils, derived from the various matters which have been fermented in obtaining the alcohol and alcoholic spirits, are more or less abundant in such manufacture, and are distinctive of the source from which each kind of alcohol or spirit was obtained. The principal oil has been long known by the name of "fusel-oil" or "amylic alcohol," which is also mixed with other bodies, such as acetic acid and butyric acid and ammonia, forming compounds more or less volatile. Besides these compounds there are present in some alcoholic spirits volatile oils which are fragrant and give names to the spirits. These oils interfere with the uses of alcohol for many purposes. Thus, in the preparation of chloroform alcohol being used which contains fusel-oil, there are a variety of products formed having this oil as their basis, existing as ethers mixed with the chloroform, rendering it unpleasant or dangerous in its most important application. In the preparation of perfumes alcohol containing fusel-oil cannot be used as a solvent from the action which this oil and its compounds exert on the essential oils used to give delicate odors. More generally, for officinal use, ordinary alcohol confers a repulsive odor when used for preparing tinctures and extracts.

I am aware that alcohol has been partially purified by distillation and the use of charcoal and hypochlorite of lime, (CaO+ClO,) but the best samples contain notable proportions of fusel-oil and ethers.

To enable others skilled in the art to use my invention, I will proceed to describe my method, which is founded on the oxidating power exerted by manganic acid and permanganic acid on the oils and ethers found in alcohol.

I take of finely-ground manganese oxide three pounds, nitrate of potash or nitrate of soda five pounds, in a state of mixture, and slowly melt them in a crucible, continuing the heat until the melted mass passes from a fluid to a stiff pasty mass. When cold the mass must be powdered and kept dry for future use. It contains manganate of potash or soda, or gives permanganates of these bases with excess of potash or soda and earthy impurities. Manganates and permanganates, however obtained, may also be used instead of the crude compound thus formed. In either case I have found that these agents act on and destroy the oils present in common alcohol and alcoholic spirits rapidly, forming valerianic and other acids, which unite to the base of the manganate used, and may be removed. For every gallon of alcohol of eighty-five or ninety per cent. I use two ounces of the manganic compound dissolved in eight ounces of water, and add the solution to the alcohol while the whole is briskly agitated. This proportion is the average quantity required for common alcohol, but so much should be used as is sufficient to destroy the odor of the fusel-oil, and the purified alcohol must then be distilled from the matters dissolved and suspended in it by gentle heat. In purifying alcoholic spirits of proof strength—such as rum, whisky, &c.—I add the fine powder of the manganic compound in successive portions, agitating the whole rapidly until the odor of the fusel-oil disappears, and then distill the purified spirits. The manganic and permanganic acids, although combined with strong bases, are decomposed by the fusel and other oils, even when a great excess of alcohol is present. Pure alcohol is, on the contrary, slowly changed into acetic acid, and should an excess of the manganic compound be used acetic acid would be produced with loss of alcohol. The valerianic, butyric, and acetic acids produced and previously existing are left after the distillation combined with the potash or soda.

What I claim as my invention, and desire to secure by Letter Patent, is—

The use of the manganates and permanganates existing as soluble compounds, however obtained, for purifying alcohol so as to adapt it to nice purposes.

LUTHER ATWOOD.

Witnesses:
WM. H. L. SMITH,
ROBERT COLBY.